United States Patent [19]

Cole

[11] Patent Number: 5,601,726
[45] Date of Patent: Feb. 11, 1997

[54] HYDROXAMETED POLYMERS IN THE BAYER PROCESS TO REDUCE SOLIDS

[75] Inventor: Robert W. Cole, San Patrico, Tex.

[73] Assignee: Cytec Technology Corp., Wilmington, Del.

[21] Appl. No.: 550,908

[22] Filed: Oct. 31, 1995

Related U.S. Application Data

[63] Continuation-in-part of Ser. No. 254,338, Jun. 6, 1994, abandoned.

[51] Int. Cl.$^6$ .................................................. B01D 21/01
[52] U.S. Cl. ........................... 210/727; 209/5; 210/728; 210/734; 423/121; 423/122
[58] Field of Search .................................... 209/5; 210/725, 210/727, 728, 732–734; 423/111, 121, 122, 130

[56] References Cited

U.S. PATENT DOCUMENTS

| | | | |
|---|---|---|---|
| 3,493,499 | 2/1970 | Zeitoun | 210/727 |
| 4,678,585 | 7/1987 | Brownrigg | 210/727 |
| 4,767,540 | 8/1988 | Spitzer et al. | 210/728 |
| 5,041,269 | 8/1991 | Moody et al. | 210/727 |
| 5,178,774 | 1/1993 | Payne et al. | 210/727 |
| 5,217,620 | 6/1993 | Mahoney et al. | 210/728 |
| 5,516,435 | 5/1996 | Lewellyn | 210/728 |
| 5,539,046 | 7/1996 | Lewellyn | 210/734 |

*Primary Examiner*—Peter A. Hadskoci
*Attorney, Agent, or Firm*—F. M. Van Riet

[57] ABSTRACT

The filtration rate of Bayer Process primary settler overflow and/or the flocculation in the initial stages of the washer train in the Bayer Process are improved by contacting the settler feed stream or the feed stream to the first stages of the washer train first with a) a lower molecular weight polymer which contains hydroxamic acid and/or salt groups and then with b) a mixture of an anionic polymer and a second, higher molecular weight polymer which contains hydroxamic acid groups.

13 Claims, No Drawings

HYDROXAMETED POLYMERS IN THE BAYER PROCESS TO REDUCE SOLIDS

CROSS REFERENCE TO RELATED APPLICATIONS

This application is a continuation-in-part of application Ser. No. 08/254,338, Filed Jun. 6, 1994, now abandoned.

The present invention is directed to a process of alumina manufacture via the Bayer Process. More particularly, it is concerned with improvements in the Bayer alumina process by the improved removal of suspended solids from the settler overflow and/or the washer train feed stream by contacting the settler feed stream or the stream to the first stages of the washer train first with a) a lower molecular weight polymer which contains hydroxamic acid groups or salts thereof and then with b) a blend of an anionic polymer flocculant and a second, higher molecular weight polymer which contains hydroxamic acid groups or salts thereof.

BACKGROUND OF THE INVENTION

The almost universally used process for the manufacture of alumina is the Bayer Process. In a typical commercial Bayer Process, raw bauxite is pulverized to a finely divided state. The pulverized ore is then fed to a slurry mixer where a 50% solids slurry is prepared using spent liquor and added caustic. This bauxite slurry is then diluted and sent through a series of digesters where, at about 300°–800° F. and 100–2000 p.s.i., 98% of the total available alumina is extracted from the ore which may contain both trihydrate and monohydrate forms of alumina. The effluent from the digesters passes through a series of flash or blow-off tanks or wherein heat and condensate are recovered as the digested slurry is cooled to about 230° F. and brought to atmospheric pressure. The aluminate liquor leaving the flashing operation contains about 1–20% solids, which consist of the insoluble residues that remain after reaction between the bauxite ore and basic material used to digest the ore and the insoluble components which precipitate during digestion. The coarser solid particles are generally removed with a "sand trap" cyclone. To separate the finer solid particles from the liquor, the slurry is normally fed to the center well of a mud settler (also called a decanter, a residue thickener or a raking thickener) where it is treated with a flocculant such as a polyacrylate polymer. As the mud settles, clarified sodium aluminate solution, referred to as "green" or "pregnant" liquor, overflows a weir at the top of the mud settling tank and is passed to subsequent processing steps. The settled solids ("red mud") are withdrawn from the bottom of the mud settler and passed through a countercurrent washing circuit (called "the washer train") for further recovery of sodium aluminate and soda. Aluminate liquor overflowing the settler still contains typically 50 to 200 mg of suspended solids per liter. This liquor is then generally further clarified by filtration to give a filtrate with 10 mg. suspended solids per liter of liquor. Alumina, in relatively pure form, is then precipitated from the filtrate as alumina trihydrate crystals. The remaining liquid phase or spent liquor is returned to the initial digestion step and employed as a digestant of additional ore after being reconstituted with additional caustic. After passage through the filtration step, the level of suspended solids should be sufficiently low to provide an alumina product from the precipitation step which meets all of the industry standards.

The aforementioned insoluble components are preferably separated from the slurry at a relatively fast rate so as to make the overall Bayer Process efficient. This is generally accomplished in large settlers, decanters, residue thickeners etc, as mentioned above. The separation itself should be clean and complete with but minimal amounts of residue remaining as a dispersed phase in the solubilized aluminate liquor. The settlers, decanters, residue (or raking) thickeners (all of which am hereinafter referred to as "setter(s)") may exceed 49 m in diameter. Some are of a multideck configuration, however, single-deck units are almost exclusively used at the present time. In operation, the settler(s) feed liquor is fed at the center of the settler(s) and clarified solution overflows at the perimeter. The settler feed liquor is added to the settler(s) via a feedpipe which exits into a feedwell centrally located at the top of the settler. As the solution flows radially across the settler, the horizontal and vertical velocities become very low and the solids i.e. red mud, sink to the bottom because the specific gravity thereof is higher than the solution. The faster the settling rate, the more material which can be processed in the settler(s). The solution overflowing the settler(s) contains very few solids whereas the underflow can contain up to 35% solids. However, the overflow contains the majority of the $Al_2O_3$ to be recovered as product. A rotating mechanism with plows mounted at an angle, slowly moves the settled solids across the bottom of the settler(s) to a discharge cone usually located in the bottom center thereof. The fine solids of the settler feed liquor settle very slowly unless accelerated by the addition of flocculants which act to bind the fine solids into flocs that often are several millimeters in diameter. The ratio of mass to drag forces is thereby increased causing the flocs to settle more rapidly. The settled solids from the settler(s) are treated in the counter-current washing circuit (washer train) discussed above, to further remove the red mud therefrom by washing. Decantation systems are employed for this purpose using washing thickeners similar in design to the settler(s). The washing operation is accomplished in as many as ten (10) stages, the solids moving counter-current to the wash stream to recover solubles and the overflow being recycled back from each stage of the washer train to its predecessor. Flocculant addition to the stages of the washer train increases the solids separation, it being generally known to utilize different flocculants in the earlier stages from those used in the latter stages, see, for example, U.S. Pat. No. 4,678,585, hereby incorporated herein by reference. The settler(s) overflow must be clarified in order to recover as pure a product as possible. The overflow is subjected to what is called polish filtration (sometimes referred to as clear pressing) whereby the solids remaining are removed. Stationary filters are also used for this purpose. It is normal to attempt to reduce the solids to below about 0.5 mg/L to enable product purity to be as high as possible since the ultimate product is used for applications where purity is essential, e.g. toothpaste.

The reduction of the amount of suspended solids in the stream comprising the Bayer Process settler(s) overflow and that which proceeds to the initial stages of the washer train, ie. the first separation stages to which the red mud slurry from the last settler are introduced, has been a major problem for many years.

Among the methods of overcoming the above problems and materially speeding up separation of suspended solids from Bayer Process streams as well as effecting a cleaner separation of the constituents, is that disclosed in U.S. Pat. No. 4,767,540, issued on Aug. 30, 1988. In this patent there is disclosed the addition of a water-soluble polymer containing pendant hydroxamic acid or salt groups to Bayer Process streams, alone or in conjunction with an anionic flocculant. The polymer containing hydroxamic acid groups may be added into the Bayer Process caustic aluminate process stream alone, subsequent to, followed by or in association with the anionic flocculent, e.g. a conventional polyacrylate polymer. This treatment is shown to reduce levels of suspended solids in the process stream as compared to then existing state-of-the-art processes.

Said U.S. Pat. No. 4,767,540, however, does not disclose the use of a lower molecular weight hydroxamated polymer followed by a blend of an anionic flocculant and a higher molecular weight hydroxamated polymer in accordance with the present invention.

SUMMARY OF THE INVENTION

It has now been found to be unexpectedly advantageous, when treating the feed to the primary settler(s) (or digester blow-off) of the Bayer Process and/or the feed to the initial stages of the washer train, to contact said feed liquor first with A) a lower molecular weight polymer containing the pendant hydroxamic acid groups and/or hydroxamic acid salt groups followed by B) a blend of an anionic flocculant and a second, higher molecular weight polymer containing hydroxamic acid or salt groups.

This sequence of addition of additives results in a clearer settler overflow as indicated by a higher filtration rate and/or more effective flocculation of the red mud in the washer train.

DETAILED DESCRIPTION OF THE INVENTION

According to the present invention, there is provided a process for improving the filtration rate of the settler overflow and/or the flocculation in the initial stages of the washer train in the Bayer Process whereby there is added to the feed to the settler or to the feed to the initial stages of the washer train, a) a water-soluble, lower molecular weight polymer containing hydroxamic acid groups or salts thereof followed by b) a blend of an anionic flocculant and a second, higher molecular weight, water-soluble polymer containing hydroxamic acid or salt groups and removing the resultant filtered solids.

The anionic flocculant used in the process of the present invention is preferably a homopolymer of an acrylic acid or a copolymer of an acrylic acid containing at least 80 molar percent of the acrylic acid or the alkali metal, alkaline earth metal or ammonium salt thereof, or a combination of any of the foregoing. Examples of acrylic acids which may be used include acrylic acid, methacrylic acid etc. Copolymers and terpolymers of said acrylic acids with copolymerizable monoethylenically unsaturated comonomers such as acrylamide, methacrylamide etc. may be used. Preferably, the anionic flocculant is a homopolymer or copolymer of an acrylic acid salt.

Both the water-soluble anionic, flocculant and water-soluble, hydroxamated polymers to be employed in the present invention should be sufficiently stable to be effective under the Bayer Process conditions used, e.g. high temperatures and strong caustic conditions, typically, 185°–225° F., and 80–4000 g./l. total alkali content (expressed as sodium carbonate equivalent).

Any water-soluble hydroxamic acid or hydroxamic acid salt group-containing polymer may be used in the process of the present invention. The useful polymers can best be exemplified by those containing pendant groups of the Formula (I);

wherein R is hydrogen or a cation. These polymers are well known in the art and can be derived from polymers containing pendant ester, amide, anhydride, nitrile, etc., groups by the reaction thereof with a hydroxylamine or its salt.

Exemplary of the polymers which may be hydroxamated for use in the process of the present invention are acrylic, methyacrylic, crotonic etc., acid ester polymers such as polymers produced from the polymerization of methyl acrylate, ethyl acrylate, t-butyl acrylate, methyl methacrylate, ethyl methacrylate, cyclohexyl methacrylate, dimethyl aminoethyl methacrylate, dimethyl aminoethyl methacrylate, dimethyl aminoethyl acrylate, methyl crotonate, etc.; polymers of maleic anhydride and esters thereof, and the like; nitrile polymers such as those produced from acrylonitrile etc; amide polymers such as those produced from acrylamide, methacrylamide and the like.

Hydroxamated polymers are well known to those skilled in the art and are specifically disclosed, as are methods for their production, in the above U.S. Pat. No. 4,767,540, hereby incorporated herein by reference. Generally, these hydroxamated polymers may be produced by reacting the polymer containing the pendant reactive group, in solution, with a hydroxylamine or its salt at a temperature ranging from about 10° C. to 100° C. for several hours. In addition to reaction of hydroxylamine or its salt with a polymer solution, it has been found that a polymer latex may be reacted directly with the hydroxylamine or its salt. The latex may be, e.g. a copolymer of acrylamide and methyl acrylate, a copolymer of acrylic acid and methyl acrylate etc. In these cases, the hydroxylamine or its salt reacts primarily with the ester groups to form hydroxamic acid groups.

Also, it has been found that inverse emulsions made of, for example, aqueous polyacrylamide or acrylamide/acrylic acid copolymers dispersed in oil can be reacted directly with hydroxylamine or its salt to give very high molecular weight polymers containing hydroxamic acid groups, all of which function efficiently in the process of the present invention.

The degree of hydroxamation, i.e., the concentration of Formula I units in the polymers useful herein, may range from about 1 to about 100 mole percent, preferably from about 15 to about 90 mole percent and, most preferably, from about 20 to about 80 mole percent of the polymer.

Suitable hydroxylamine salts include the sulfates, sulfites, phosphates, perchlorates, hydrochlorides, acetates, propionates and the like. The pH of the solution of the polymer to be hydroxamated is adjusted to over about 6.0, preferably over about 10.0, beforehand.

Any water-soluble polymer may be used in the present process which, after hydroxamation, performs to settle suspended solids. Thus, homopolymers, copolymers, terpolymers, etc. of the above exemplified monomers may be used. Suitable comonomers which, by copolymerization, may form, for example, up to about 95 mole percent of the polymers useful herein can include acrylic acid, sodium acrylate, methacrylic acid, maleic anhydride, vinyl acetate, vinyl pyrrolidone, butadiene, styrene as well as others of the above enumerated esters, amides an/or nitriles and the like as is known in the art and is set forth in the above-incorporated patents as long as such copolymers, terpolymers etc., are water-soluble after hydroxamation. The weight average molecular weight of the hydroxamated polymers useful in the process of the present invention range from about $1\times10^4$ to about $3\times10^7$. The molecular weight of the hydroxamated polymer is best controlled by controlling the molecular weight of the polymer to be hydroxamated, such by the use of chain-length regulators, e.g. mercaptans, during polymerization.

The water-soluble polymer containing hydroxamic acid and/or salt groups which is first added to the settler(s) feed and/or the feed to the initial washer stages of the Bayer process in accordance with the present invention must have a molecular weight lower than that of the hydroxamic acid and/or salt group containing polymer which forms part of the blend which is added thereafter. Although any polymer having a molecular weight within the above range may be used, it is preferred that the first added hydroxamated polymer have a molecular weight of below about 7 million, most preferably below about 3 million. Preferably, the hydroxamated polymer which constitutes part of the blend with the anionic flocculant will have a molecular weight over about 7 million, most preferably over about 10 million, however, the specific molecular weight of either additive is critical only to the extent that the hydroxamated polymer of the blend has a molecular weight higher than that of the hydroxamated polymer added individually, i.e., the lower molecular weight polymer.

The blend of the anionic flocculant and the higher molecular weight polymer containing hydroxamic acid and/or salt groups should be comprised of from about 10 to about 90 weight percent of the higher molecular weight polymer and about 90 to about 10 weight percent of the anionic flocculant, preferably about 80 to about 20 and about 20 to about 80, same basis, respectively, most preferably about 70 to about 30 and about 30 to about 70, same basis, respectively.

The blend can be added to the stream being treated as a single dose or via a series of dosages, it being preferred that the blend be added in at least 2 dosages for purposes of insuring complete admixture with the stream, The anionic flocculant and the water-soluble, hydroxamated polymers used in the present invention are employed by adding them, i.e., the lower molecular weight polymer and/or the blend, in the form of aqueous solutions, to the feed to the settler(s) containing solubilized alumina and suspended solids dispersed throughout, and/or the feeds to the initial stages of the washer train, in an amount at least sufficient to settle suspended solids therefrom. Generally, for best results, at least about 0.1 mg, of the lower molecular weight hydroxamated polymer, per liter of the settler(s) and/or washer train stage feeds should be employed. More preferably, at least 1.0 mg of the lower molecular weight hydroxamated polymer, per liter of the settler(s) and/or washer stage feeds should be employed. The blend of the anionic flocculant hydroxamated polymer may be added in amounts ranging from about 0.01 to about 40 lbs. of blend solids per ton of solids to be settled.

It is understood, that higher amounts than those above stated may be employed without departing from the scope of the invention, although generally a point is reached in which additional amounts of blend and/or hydroxamated lower molecular weight polymer do not improve the separation rate over already achieved maximum rates. Thus, it is uneconomical to use excessive amounts of either additive when this point is reached.

The addition of the water-soluble, lower molecular weight hydroxamated polymer should precede the addition of the blend by sufficient time such as to enable the lower molecular weight polymer to at least begin to perform. Thus, for example, when both additives are added to the settler feed there must be sufficient time allowed between the individual additions to enable the lower molecular weight hydroxamated polymer to at least begin to flocculate the suspended solids. The same applies to different addition points of the initial washer train stages.

The following examples are set forth for purposes of illustration only and are not to be construed as limitations on the present invention except as set forth in the appended claims. All parts are by weight unless otherwise specified.

EXAMPLES 1–29

To a vessel containing a settler feed from a commercial Bayer Process alumina plant is added, as set forth in Table I, below, an 80 mole percent hydroxamated polymer containing 10 mole percent of acrylic acid units and 10 mole percent of acrylamide units and having a weight average molecular weight of about 350,000 (identified as A). A commercially available ammonium polyacrylate flocculant having a number average molecular weight of about 10–15 million (identified as B) is added alone (comparative) and as a 70/30 blend, respectively, with a second polymer containing 18 mole percent hydroxamate groups, 52 mole percent of acrylic acid units and 30 mole percent acrylamide units and having a weight average molecular weight of 12–20 million (identified as C).

The additives are added as indicated with mixing between each addition such as to simulate the mixing in the plant. The results are set forth in Table 1, below.

All additives are made up to 0.1% with 10 gpl caustic in water. The filtration volume is 100 ml.

Examples 1–14 employ one settler feed stream, Examples 15–17 employ another different settler feed stream and Examples 18–29 employ a third settler feed stream.

TABLE I

| EXAMPLE | ADD. #1 | ADD. #2 | ADD. #3 | mis #1 | mis #2 | mis #3 | Filtration Rate (kL/hr/m²) |
| --- | --- | --- | --- | --- | --- | --- | --- |
| 1X | — | B | B | — | 3.0 | 3.0 | 4,386 |
| 2X | — | B | B | — | 2.0 | 2.0 | 2,819 |
| 3X | — | B | B | — | 2.5 | 2.5 | 6,579 |
| 4X | A | B | B | 0.5 | 2.0 | 2.0 | 5,639 |
| 5X | A | B | B | 1.0 | 2.0 | 2.0 | 5.639 |
| 6X | A | B | B | 2.0 | 2.0 | 2.0 | 5,263 |
| 7X | A | B | B | 0.25 | 2.0 | 2.0 | 7,894 |
| 8X | — | B | B | — | 2.0 | 2.0 | 4,644 |
| 9X | — | C | C | — | 3.0 | 3.0 | 7,177 |
| 10X | — | C | C | — | 2.5 | 2.5 | 6,073 |
| 11 | A | C | C | 0.5 | 2.0 | 2.0 | 8,772 |
| 12 | A | C | C | 0.5 | 2.0 | 2.0 | 11,287 |
| 13 | A | C | C | 0.5 | 2.0 | 2.0 | 9,288 |

TABLE I-continued

| EXAMPLE | ADD. #1 | ADD. #2 | ADD. #3 | mis #1 | mis #2 | mis #3 | Filtration Rate (kL/hr/m$^2$) |
|---|---|---|---|---|---|---|---|
| 14X | — | C | C | — | 2.0 | 2.0 | 4,644 |
| 15X | — | C | C | — | 4.0 | 4.0 | 1,338 |
| 16 | A | C | C | 2.0 | 4.0 | 4.0 | 1,925 |
| 17 | A | C | C | 2.0 | 4.0 | 4.0 | 1,925 |
| 18X | — | C | C | — | 3.0 | 3.0 | 1,462 |
| 19 | A | C | C | 0.5 | 3.0 | 3.0 | 3,036 |
| 20 | A | C | C | 1.0 | 3.0 | 3.0 | 3,759 |
| 21 | A | C | C | 1.5 | 3.0 | 3.0 | 3,588 |
| 22X | — | B | B | — | 3.0 | 3.0 | 0,897 |
| 23X | A | B | B | 0.5 | 3.0 | 3.0 | 1,974 |
| 24X | A | B | B | 1.0 | 3.0 | 3.0 | 3,289 |
| 25X | A | B | B | 1.5 | 3.0 | 3.0 | 3,759 |
| 26 | A* | C | C | 0.05 | 3.0 | 3.0 | 3,588 |
| 27 | A | C | C | 5.0 | 3.0 | 3.0 | 3,588 |
| 28X | — | C | C | — | 3.0 | 3.0 | 1,925 |
| 29 | A* | C | C | 0.02 | 3.0 | 3.0 | 3,432 |

ADD = additive
*12% solution
X = comparative

As can be readily appreciated, the results of Table I show that an overall superior effect is obtained as evidenced by the higher filtration rate when the blend of the anionic flocculant and the higher molecular weight hydroxamated polymer is used subsequent to the addition of the lower molecular weight, hydroxamated polymer.

EXAMPLES 30–39

Following the testing procedure of Examples 1–29, a series of lower molecular weight hydroxamated polymers are employed in the treatment of a settler feed stream from a commercial Bayer Process plant. The same blend of Examples 1–29, i.e., that designated as C, is then added. The results are shown in Table II, below.
Polymer D=80% hydroxamated; M.W. 220,000
Polymer E=60% hydroxamated; M.W. 350,000
Polymer F=100% hydroxamated; M.W. 350,000
Polymer G=80% hydroxamated; M.W. 700,000
Polymer H=20% hydroxamated; M.W. 350,000
Polymer I=25% hydroxamated; M.W. 10 million
Polymer J=80% hydroxamated; M.W. 100,000

TABLE II

| EXAMPLE | ADD. #1 | ADD. #2 | ADD. #3 | mis #1 | mis #2 | mis #3 | Filtration Rate (kL/hr/m$^2$) |
|---|---|---|---|---|---|---|---|
| 30X | — | C | C | — | 3.0 | 3.0 | 1,650 |
| 31 | A | C | C | 1.0 | 3.0 | 3.0 | 1,925 |
| 32 | D | C | C | 1.0 | 3.0 | 3.0 | 1,754 |
| 33 | E | C | C | 1.0 | 3.0 | 3.0 | 2,134 |
| 34X | — | C | C | — | 3.0 | 3.0 | 1,645 |
| 35 | F | C | C | 1.0 | 3.0 | 3.0 | 2,392 |
| 36 | G | C | C | 1.0 | 3.0 | 3.0 | 3,158 |
| 37 | H | C | C | 1.0 | 3.0 | 3.0 | 2,256 |
| 38 | I | C | C | 1.0 | 3.0 | 3.0 | 3,298 |
| 39 | J | C | C | 1.0 | 3.0 | 3.0 | 2,392 |

X = comparative

These data clearly show that variation of the degree of hydroxamation and the molecular weight of the lower molecular weight hydroxamated polymer still results in a superior increase in the overflow filtration rate.

EXAMPLE 40

Following the procedure of Example 12 except that the anionic flocculant of the blend is a different, commercially available polyacrylate having a number average molecular weight of about 10–15 million, similar results are achieved.

EXAMPLE 41

The anionic flocculant of Example 40 is replaced by a 90/10 sodium acrylate/acrylamide copolymer. Similar results are achieved.

EXAMPLE 42

Replacement of the hydroxamated polymer of blend C of Example 13 with a polymer which is 25% hydroxamated and has a weight average molecular weight of about 12 million results in a similar increased filtration rate.

EXAMPLE 43

Again following the procedure of Example 12 except that the anionic flocculant is a homopolymer of sodium acrylate, similar results are observed.

EXAMPLES 44–72

When Examples 1–29 are again followed individually using the additives of Table I, except that a feed to the first stage of the washer train of a commercial Bayer Process alumina plant is used as the charge medium, an overall improvement in flocculation is shown by those examples representative of the instant invention as compared to the other comparative examples.

I claim:

1. In the Bayer alumina process wherein there is produced a settler feed stream and streams containing suspended solids flowing into initial stages of a washer train, the improvement which comprises 1) admixing with either or both of said streams an effective amount of A) a first, water-soluble polymer containing pendant hydroxamic acid or salt groups and having a molecular weight below about 7,000,000 and then B) an effective amount of a blend of i) an anionic, water-soluble, acrylic flocculant and ii) a second, water-soluble polymer containing pendant hydroxamic acid or salt groups and having a molecular weight higher than said first polymer to flocculate the suspended solids, wherein the blend comprises from about 10 to about 90 weight percent of the second polymer and about 90 to about 10 weight percent of the anionic flocculant and 2) removing the resulting flocculated suspended solids from the stream or streams.

2. A process according to claim 1 wherein A) and B) are added to the settler feed stream.

3. A process according to claim 2 wherein said anionic flocculant is an acrylate polymer.

4. A process of claim 1 wherein said hydroxamic acid or salt group containing polymers are derived from polymers containing pendant ester, amide, anhydride or nitrile groups.

5. A process of claim 1 wherein the degree of hydroxamation of said first polymer ranges from about 1 to about 100 mole percent.

6. A process according to claim 1 wherein said anionic flocculant is an acrylate polymer.

7. A process according to claim 1 wherein said anionic flocculant is an acrylate polymer and said hydroxamic acid or salt group containing polymers are derived from a polymer containing pendant ester, amide, anhydride or nitrile groups.

8. A process according to claim 7 wherein said anionic flocculant is an acrylate polymer and said hydroxamic acid or salt group containing polymers are derived from an amide polymer.

9. A process according to claim 8 wherein said acrylate polymer is a polymer of an acrylic acid and said amide polymer is a polymer of acrylamide.

10. A process according to claim 1 wherein A) and B) are added to the streams flowing into the initial stages of the washer train.

11. A process according to claim 10 wherein said flocculant is an acrylate polymer.

12. A process according to claim 10 wherein said hydroxamic acid or salt group containing polymers are derived from a polymer containing pendant ester, amide, anhydride or nitrile groups.

13. A process according to claim 10 wherein said flocculant is an acrylate polymer and said hydroxamic acid or salt groups containing polymers are derived from a polymer of acrylamide.

* * * * *